J. T. & W. R. RODGERS.
COTTON CLEANER.
APPLICATION FILED JAN. 23, 1917.

1,260,581.

Patented Mar. 26, 1918.
3 SHEETS—SHEET 1.

J. T. Rodgers and
W. R. Rodgers
Inventors

Witnesses by

Attorneys

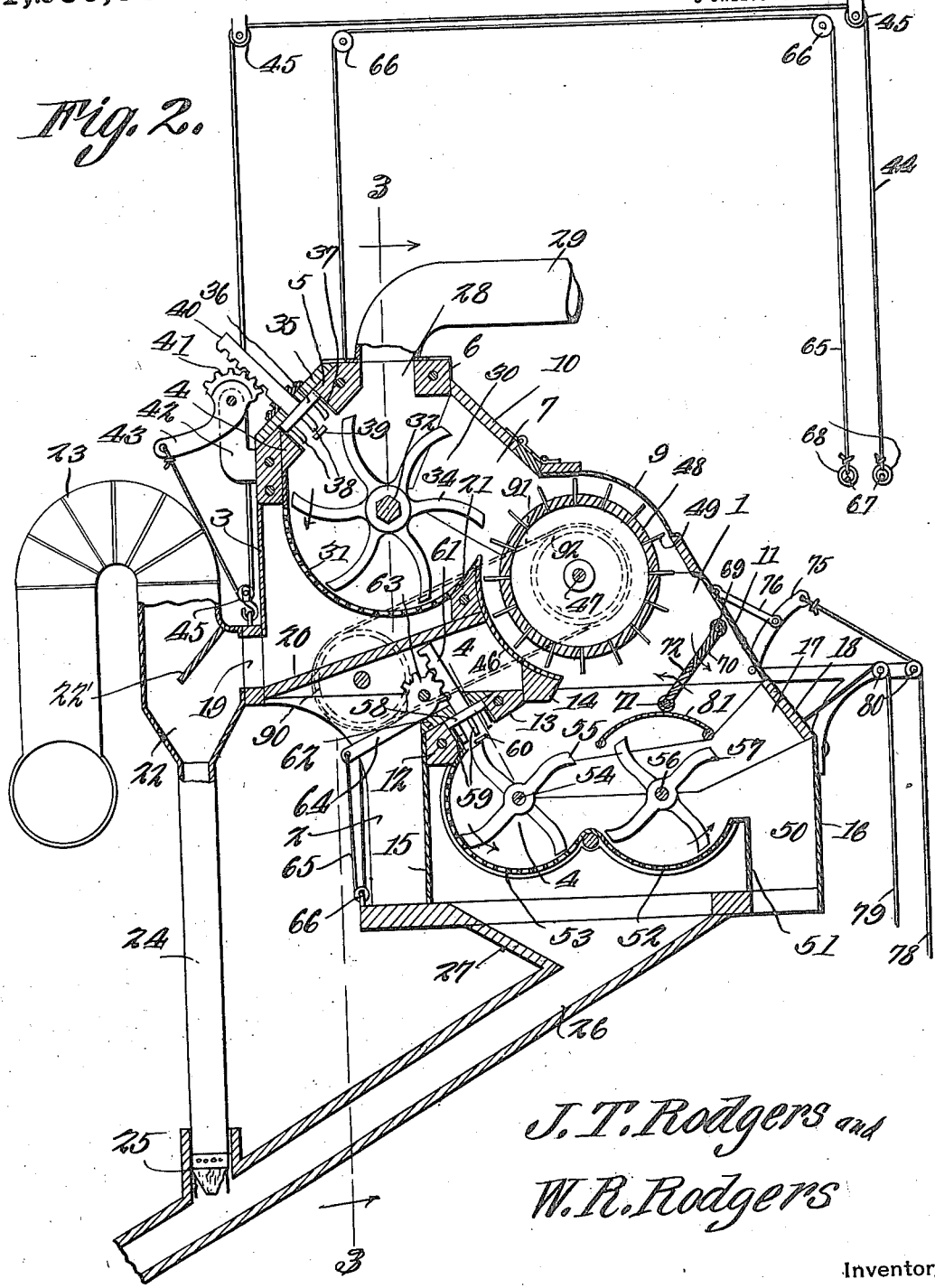

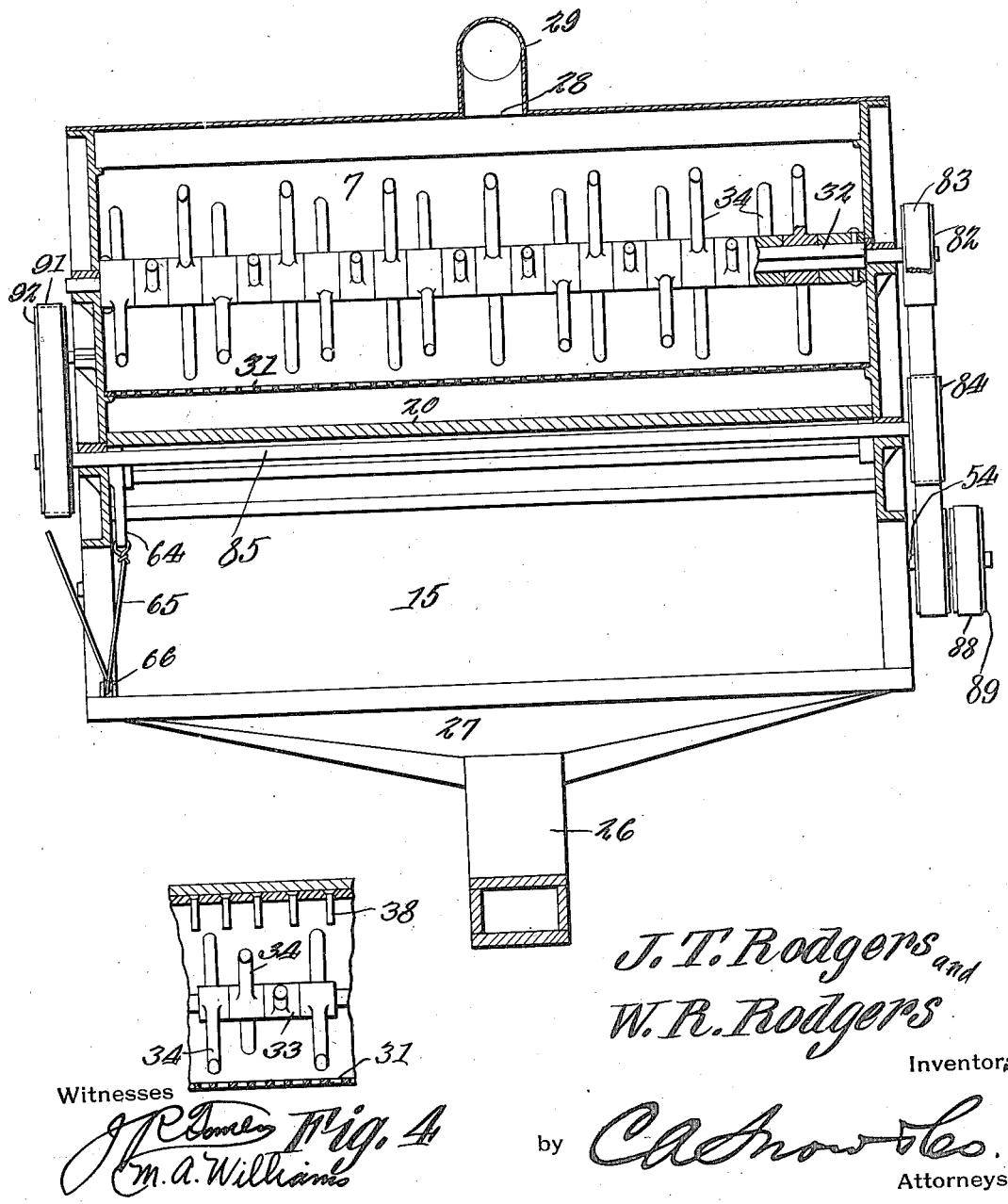

UNITED STATES PATENT OFFICE.

JAMES T. RODGERS AND WILLIAM R. RODGERS, OF OKLAHOMA, OKLAHOMA.

COTTON-CLEANER.

1,260,581.

Specification of Letters Patent.    Patented Mar. 26, 1918.

Application filed January 23, 1917.   Serial No. 144,021.

*To all whom it may concern:*

Be it known that we, JAMES T. RODGERS and WILLIAM R. RODGERS, citizens of the United States, residing at Oklahoma city, in the county of Oklahoma and State of Oklahoma, have invented a new and useful Cotton-Cleaner, of which the following is a specification.

This invention relates to machines for cleaning cotton prior to being supplied to a cotton gin, one of the objects of the invention being to provide a machine which will remove from the seed cotton, dirt, sand, leaves, trash, hull, shale, straw, grass seed, and in fact all other foreign substances, the machine being also capable of use in treating gathered boll cotton, so as to disintegrate the bolls and clean the dirt and trash therefrom so as to put the cotton in better condition for the gin than has heretofore been possible.

Several efficient cotton cleaning machines are now in use among which may be mentioned the machine disclosed in Patent No. 690,614, issued on January 7, 1902. It has been found, however, that cotton grown in some sections of the country, such as Oklahoma, and portions of Texas, gets into very bad condition near the end of the season and that it is practically impossible, at one operation of any cleaner now in use, to put this cotton into as good condition for the gins as is desired. In fact, many ginners are compelled to run this cotton more than once through their cleaners, thus adding materially to the cost of cleaning in that it is necessary both to operate two machines and also to utilize extra power and labor.

It is well known that the condition of cotton as it is picked from the field varies greatly during the harvesting season. During the first part of the season the first bolls that are opened can be picked comparatively clean and do not contain much dirt, trash or hulls. However, as the season advances and the stalks, leaves and bolls are killed by frost, the cotton becomes trashy. Ultimately the storms beat the cotton out of the open bolls and onto the ground and it becomes exceedingly dirty and full of trash. Cotton in this condition requires more than an ordinary cleaning process in order to properly renovate it and put it into condition to produce a salable grade of lint cotton. One of the objects of the present invention is to provide a cotton cleaner which can be used for cleaning cotton in all stages and conditions, it being possible to use it as a single cleaner and separator for treating the ordinary early picked cotton or to use it as a double cleaner when treating very dirty cotton, the machine also being capable of use as a single or double boll thresher.

A further object is to provide a simple, compact and durable machine of this character which can be quickly adjusted for use either as a single cleaner, a double cleaner, or a single or double boll thresher and cleaner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Fig. 2 is a vertical longitudinal section therethrough.

Fig. 3 is a section on line 3—3 Fig. 2.

Fig. 4 is a section through a portion of the machine on line 4—4 of Fig. 2.

Figure 1:
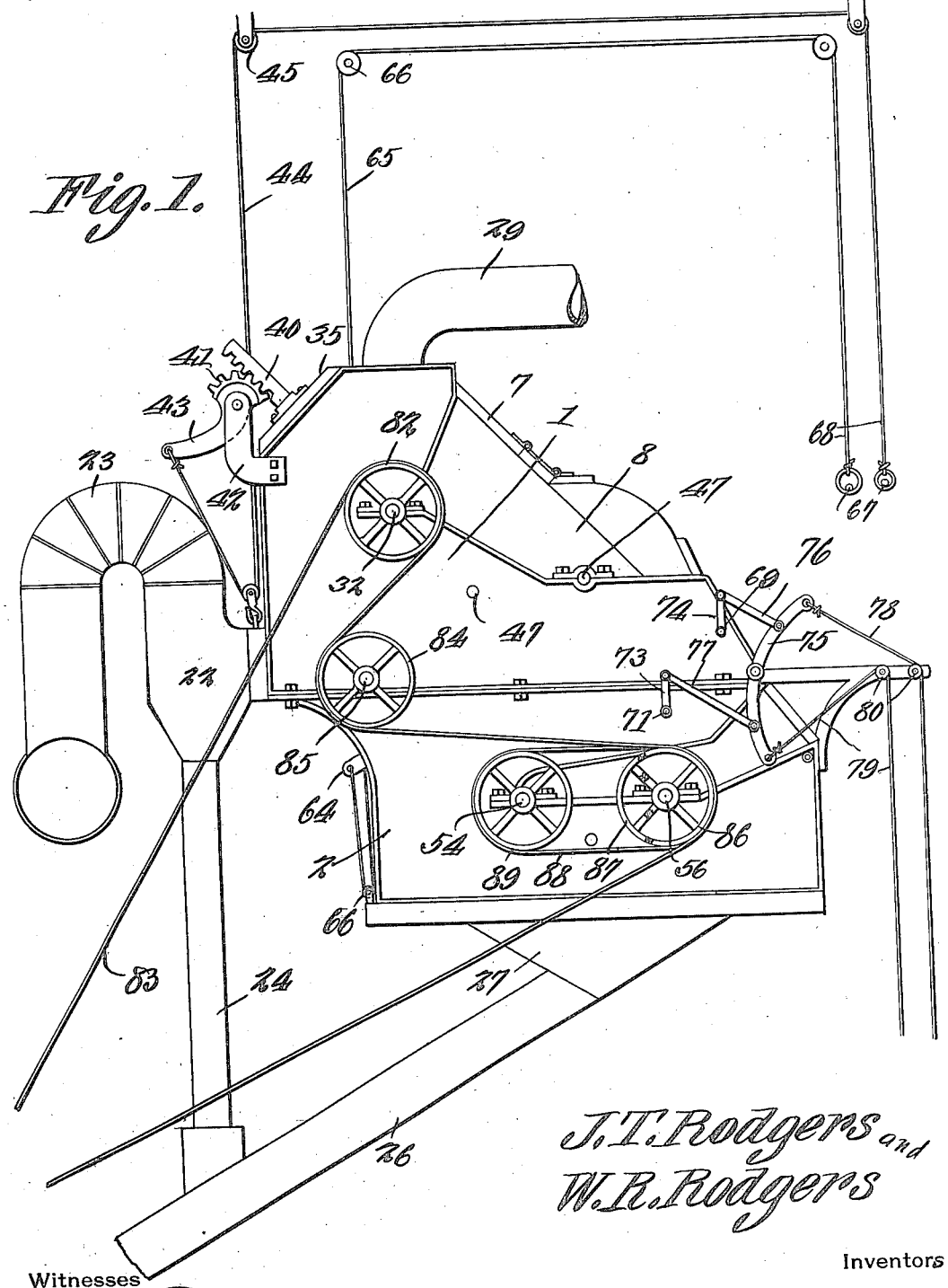
Figure 1 is a side elevation of the machine.

Referring to the figures by characters of reference 1 and 2 designate superposed side castings suitably fastened together, side castings 1 being connected by a back wall 3, spaced cross beams 4, 5 and 6, and a front cover 7. This front cover is made up of side members 8 connected by an outwardly bulged or arched sheet metal plate 9 and carrying a hinged closure 10 whereby access may be had readily to the interior of the machine. A front plate 11 connects the side castings 1 below and in front of the cover 7.

The lower side castings 2 are connected by cross beams 12, 13 and 14 and by a back plate 15, there being a screen panel 16 connecting the portions of the side castings 2 and the upper end of this panel being spaced from plate 11 by a cross strip 18.

An outlet opening 19 is formed below the back plate 15 and inclined downwardly toward this opening is a transverse partition 20 preferably held in position by a cross beam 21 which is centrally disposed and which is located above the beam 13. The opening 19 communicates with a receiver 22 from the top of which extends a flue 23 leading to a fan casing not shown. An outlet tube 24 extends downwardly from the bottom of the receiver 22 and is provided, at its lower end, with a valve made up preferably of four fabric flaps 25 adapted normally to close together so as to prevent the escape of material from the flue until a predetermined amount has accumulated, the flaps being held in closed positions by suction as hereinafter pointed out. It is preferred to have the tube 24 discharge into a tube or flue 26 extending from a hopper 27 which constitutes the bottom of the cleaner and is arranged between the lower edge portions of the side castings 2.

An inlet opening 28 is formed between the beams 5 and 6 and leading to this opening is a flue 29 designed to guide cotton from a wagon or the like. The opening 28 is in communication with a separating compartment 30 located above the partition 20 and the bottom of which consists of an arcuate screen 31 which is concentric with a transverse polygonal shaft 32 journaled within the side castings 1. On this shaft are arranged contacting sleeves 33 from each of which project oppositely extending beater arms 34, these arms being preferably curved oppositely to their direction of rotation. The free ends of the arms are adapted to work close to the screen 31.

Secured upon the beams 4 and 5 is a cover plate 35. A breaker bar 36 is slidably mounted within the space formed between beams 4 and 5, there being wear plates 37 on these beams for engagement by the breaker bar. This breaker bar has breaker fingers 38 extending inwardly therefrom and so located that when the bar 36 is pushed inwardly against stops 39 extending from the side castings 1, the fingers 38 will project between the paths of the beater arms 34.

Racks 40 are slidably mounted in the cover plate 35 and are fixedly connected one to each end of the breaker bar 36. These racks are constantly engaged by connected segmental gears 41 supported by brackets 42. An arm 43 is extended outwardly from one segmental gear and to this arm is connected one end of an actuating cord 44 the other end of which is located where it can be conveniently reached by the operator. This cord is mounted on suitable guide sheaves 45 so that when the cord is pulled downwardly at its free end, the arm 43 will also be pulled downwardly and the breaker bar thus drawn into position between beams 4 and 5 so that the fingers 38 will be shifted out of active positions. When, however, said cord 44 is released, the weight of the bar 36 and the parts carried thereby will be sufficient to cause the bar to gravitate against the stops 39, thus to bring the fingers 38 into active positions.

Extending from that end of the screen 31 remote from the breaker bar 36 is a concave 46 formed preferably of sheet metal and diametrically opposed to the arcuate plate 9. Both the concaves and the plate 9 are concentric with a shaft 47 which is journaled within the side castings 1 and carries a drum 48 from the periphery of which radiate flights 49 which are preferably of sheet metal and which extend throughout the length of the drum. These flights work close to the concave 46 and the arcuate plate 9 and constitute means for directing cotton from the beater arms 34 over the drum 48 and under the plate 9.

The screen panel 16 constitutes the outer wall of an outlet flue 50. The inner wall 51 of this flue extends downwardly from one end of a concaved screen 52 extending partly over the hopper 27. Another concaved screen 53 is interposed between screen 52 and the cross beam 12. Concentric with the screen 53 is a shaft 54 carrying beater arms 55 which can be similar to the arms 34. Another shaft 56 is journaled in the side castings 2 and is concentric with the concave 52, this shaft being also provided with beater arms 57 similar to the arms 55. A breaker bar 58 is slidably mounted between the beams 12 and 13 and has breaker fingers 59 extending therefrom. Stop projections 60 are arranged on the side castings 2 and serve to limit the downward movement of the bar 58. Racks 61 extend from the breaker bar 58 and through a cover plate 62 which is secured to the beams 12 and 13. These racks constantly mesh with connected segmental gears 63 from one of which extends an arm 64. An actuating cord 65 is attached to this arm and has one end located where it can be conveniently reached by the operator. This cord is mounted on suitably arranged guide sheaves 66 whereby when the cord is pulled downwardly at its free end the arm 64 will be pulled downwardly and the breaker bar 58 moved upwardly out of active position. However, when cord 65 is released, bar 58 and the parts carried thereby will gravitate downwardly so as to bring fingers 59 into position between the paths of the breaker arms 55. The cords 44 and 65 are held normally in lowered positions at their free ends by pins 67 which are adapted to be engaged by rings 68 connected to the cords.

Journaled within the side castings 1 close to the front plate 11 is a rod 69 to which is secured a gate 70. Another rod 71 is journaled in the side castings 2 close to the upper edges thereof and substantially in vertical alinement with the shaft 56, this rod having a gate 72 secured to it. Connected to one end of the rod 71 is a crank arm 73 and another crank arm 74 is connected to one end of the rod 69. A centrally fulcrumed lever 75 is mounted on the front portion of the machine and the upper arm of this lever is connected to the crank arm 74 by a link 76, while the lower arm of the lever is connected by a link 77 to the crank arm 73. Actuating cords 78 and 79 are attached to the respective arms of the lever and are mounted on suitably arranged guide sheaves 80, these cords extending to points where they can be conveniently reached by the operator. When the gates 70 and 72 are closed, they lap at their meeting edges and coöperate to form an incline along which cotton will gravitate to an arcuate guard plate or deflector 81 which is above and concentric with the shaft 56.

The shaft 32 is provided at one end with a pulley 82 designed to receive motion through a belt 83 from any suitable drive element, not shown, this belt being extended under a pulley 84 secured to one end of a transverse shaft 85 which is journaled within the side castings 1 and extends under the partition 20. From this pulley 84 the belt extends to and in engagement with a pulley 86 secured to one end of the shaft 56 and another pulley 87 is secured to this shaft and is adapted to transmit motion through a belt 88 to a pulley 89 secured to one end of the shaft 54. Shaft 85 extends entirely through the machine and is provided at that end remote from pulley 84 with another pulley 90 shown by dotted lines in Fig. 2, and a belt 91 transmits motion from pulley 90 to another pulley 92 secured to the shaft 47.

When it is desired to use the machine for cleaning seed cotton which is comparatively free of dirt, hulls and the like, the cord 79 is pulled so as to cause the gates 70 and 72 to swing open in the direction indicated by the arrows in Fig. 2. The breaker bar 36 is held retracted as shown in Fig. 2 and the exhaust fan with which the flue 23 communicates is set in motion. The creation of a suction to the fan will result in the closing of the flaps 25 and also in a suction through the flue 29 so that when the outer end of the flue is placed in a wagon or the like containing cotton, the cotton will be drawn through the flue and into the separating compartment 30 and against the screen concave 31. The rotating beater arms 34 will beat out the foreign substances and they will be removed through the openings in the screen 31 and drawn into the receiver 22. The heavy foreign substances will gravitate into the flue 24 and be supported by the closed flaps 25 while the light dust will be carried out through the flue 23. After the weight of the accumulated substances in the flue 24 becomes sufficient to open the flaps 25, said substances will gravitate into the flue 26. After the cotton has been acted upon by the beater arms 34 it is taken up by the flights 49 and discharged between the opened gates 70 and 72 so as to pass out through the passage 50.

Should the cotton be exceedingly dirty so that the cleaning operation cannot properly be effected as above described, the operator closes the gates 70 and 72. Consequently, cotton after being acted on by the beater arms 34 will be directed by the drum 48 onto the closed gates 70 and 72 and the guard plate 81 and thence onto the beater arms 55. These arms will draw the cotton over the concave 53 to the beater arms 54 which will break it up and carry it over the screen 52. The screens 53 and 52 are much coarser than the screen 31 because the cotton is not subjected to suction at these points. Consequently the foreign substances broken up on the concaves 53 and 52 will be free to fall into the hopper 27 and thence pass outwardly through the flue 26. The cotton after leaving the concave 52 will be directed into the passage 50.

Should it be desired to thresh the cotton bolls, either a single or a double threshing operation can be effected. Where a single threshing operation is to be carried out, the gates 70 and 72 are opened and the breaker bar 36 is lowered to bring its fingers 38 into active positions. Where a double threshing operation is to be carried out, the gates 70 and 72 are closed and both of the breaker bars 36 and 58 are lowered.

By providing the means described for collecting the heavy foreign substances separated from the cotton, said substances can be weighed and deducted from the weight of the cotton.

A deflector 22' is located within the receiver 22 so as to direct the foreign substances downwardly into the flue 24.

What is claimed is:—

1. A cotton cleaner including a structure having a cotton inlet and a cotton outlet, a suction flue in communication with the interior of the structure, a screen concave interposed between the cotton inlet and the suction flue, a revoluble series of beater arms between said screen and the cotton inlet, an imperforate concave extending from said screen concave, a drum revolubly mounted above said concave, flights extending therefrom, separate screen concaves below the drum, a series of revoluble beater arms above each concave, said last mentioned concaves and beater arms being disposed at one side of the cotton outlet, and means adjacent the drum for closing direct communication between the drum and the cotton outlet and deflecting cotton to the beater arms below the drum.

2. A cotton cleaner including a structure having a cotton inlet and a cotton outlet, a suction flue in communication with the interior of the structure, a screen concave interposed between the cotton inlet and the suction flue, a revoluble series of beater arms between said screen and the cotton inlet, an imperforate concave extending from said screen concave, a drum revolubly mounted above said concave, flights extending therefrom, separate screen concaves below the drum, a series of revoluble beater arms above each concave, said last mentioned concaves and beater arms being disposed at one side of the cotton outlet, and means adjacent the drum for closing direct communication between the drum and the cotton outlet and directing cotton to the beater arms below the drum.

3. A cotton cleaner including a structure having a cotton inlet and a cotton outlet, a suction flue in communication with the interior of the structure, a screen concave interposed between the cotton inlet and the suction flue, a revoluble series of beater arms between said screen and the cotton inlet, an imperforate concave extending from said screen concave, a drum revolubly mounted above said concave, flights extending therefrom, separate screen concaves below the drum, a series of revoluble beater arms above each concave, said last mentioned concaves and beater arms being disposed at one side of the cotton outlet, means adjacent the drum for closing direct communication between the drum and the cotton outlet and directing cotton to the beater arms below the drum, upper and lower breaker bars engaging certain of the screen concaves, breaker fingers extending therefrom, and adapted to project between the paths of adjacent beater arms, and separate means for shifting the respective breaker bars to remove the breaker fingers from active positions.

4. A cotton cleaner including a structure having a cotton inlet and a cotton outlet, a suction flue in communication with the interior of the structure, a screen concave interposed between the cotton inlet and the suction flue, a revoluble series of beater arms between said screen and the cotton inlet, an imperforate concave extending from said screen concave, a drum revolubly mounted above said concave, flights extending therefrom, separate screen concaves below the drum, a series of revoluble beater arms above each concave, said last mentioned concaves and beater arms being disposed at one side of the cotton outlet, means adjacent the drum for closing direct communication between the drum and the cotton outlet and directing cotton to the beater arms below the drum and separate means for collecting heavy foreign substances discharged through the respective screen concaves and conveying them to a common point.

In testimony that we claim the foregoing as our own, we have hereto affixed our signatures in the presence of two witnesses.

JAMES T. RODGERS.
WILLIAM R. RODGERS.

Witnesses:
  R. J. MORROW,
  R. L. MATTHEWS.